(12) United States Patent
Yokoyama

(10) Patent No.: US 12,081,842 B2
(45) Date of Patent: Sep. 3, 2024

(54) IMAGE PROCESSING APPARATUS, IMAGE PROCESSING METHOD, AND PROGRAM

(71) Applicant: SONY GROUP CORPORATION, Tokyo (JP)

(72) Inventor: Suguru Yokoyama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/794,439

(22) PCT Filed: Feb. 22, 2021

(86) PCT No.: PCT/JP2021/006576
§ 371 (c)(1),
(2) Date: Jul. 21, 2022

(87) PCT Pub. No.: WO2021/182091
PCT Pub. Date: Sep. 16, 2021

(65) Prior Publication Data
US 2023/0073093 A1    Mar. 9, 2023

(30) Foreign Application Priority Data

Mar. 9, 2020  (JP) ................................ 2020-039882

(51) Int. Cl.
*H04N 21/234*    (2011.01)
*H04N 21/81*    (2011.01)

(52) U.S. Cl.
CPC ..... *H04N 21/812* (2013.01); *H04N 21/23418* (2013.01); *H04N 21/23424* (2013.01)

(58) Field of Classification Search
None
See application file for complete search history.

(56) References Cited

U.S. PATENT DOCUMENTS

| | | | | |
|---|---|---|---|---|
| 5,892,554 | A  * | 4/1999 | DiCicco | H04N 5/272 |
| | | | | 382/284 |
| 7,444,659 | B2 * | 10/2008 | Lemmons | H04N 21/25883 |
| | | | | 375/E7.006 |
| 10,694,262 | B1 * | 6/2020 | Hedman | H04N 21/44008 |
| 2003/0028873 | A1 * | 2/2003 | Lemmons | H04N 21/25883 |
| | | | | 348/588 |
| 2005/0137958 | A1 * | 6/2005 | Huber | G06Q 30/02 |
| | | | | 705/37 |
| 2006/0026628 | A1 * | 2/2006 | Wan | H04N 5/2723 |
| | | | | 375/240.26 |

(Continued)

FOREIGN PATENT DOCUMENTS

| | | |
|---|---|---|
| JP | 2016-061885 A | 4/2016 |
| JP | 2017-510167 A | 4/2017 |
| WO | WO 2013/089146 A1 | 6/2013 |

*Primary Examiner* — William J Kim
(74) *Attorney, Agent, or Firm* — Paratus Law Group, PLLC

(57) ABSTRACT

There is provided an image processing apparatus, an image processing method, and a program that enable display of an advertisement in an appropriate region within a captured image. The image processing apparatus sets, on the basis of density of people in a predetermined region within a captured image, an advertisement display region for superimposition of an advertisement image on the captured image. The present technology is applicable to a television (TV) broadcast system.

14 Claims, 11 Drawing Sheets

(56) References Cited

U.S. PATENT DOCUMENTS

| | | | |
|---|---|---|---|
| 2007/0279494 A1* | 12/2007 | Aman | G06V 20/40 |
| | | | 348/169 |
| 2008/0043157 A1* | 2/2008 | Jones | G09F 19/18 |
| | | | 348/E13.058 |
| 2010/0238351 A1* | 9/2010 | Shamur | H04H 60/37 |
| | | | 348/E5.062 |
| 2013/0024293 A1* | 1/2013 | Tinsman | G06Q 30/0275 |
| | | | 705/14.69 |
| 2014/0372372 A1* | 12/2014 | Schlomka | G06F 16/23 |
| | | | 707/609 |
| 2016/0253601 A1* | 9/2016 | Akpala | G06Q 10/02 |
| | | | 705/5 |
| 2016/0307335 A1* | 10/2016 | Perry | H04N 23/90 |

* cited by examiner

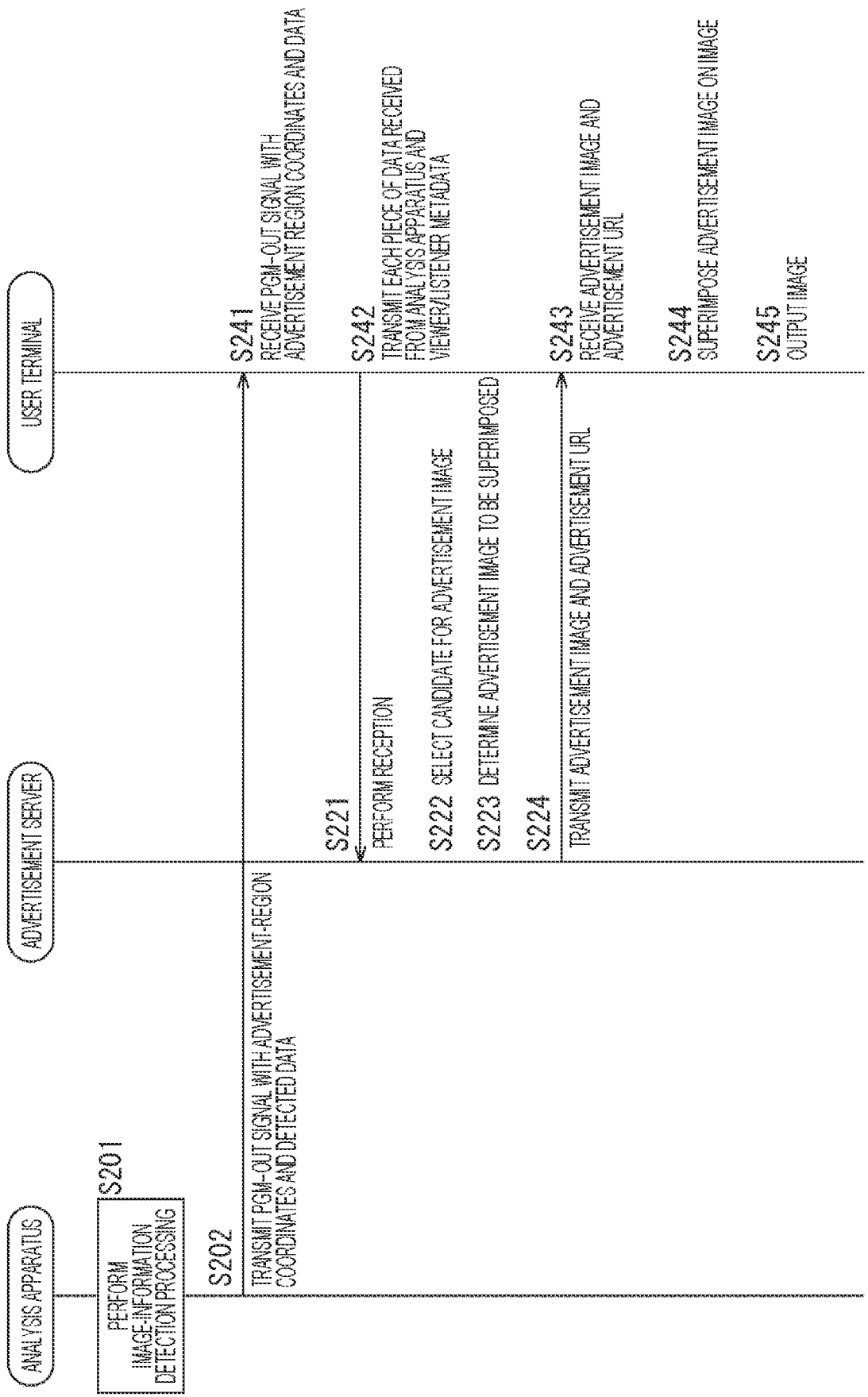

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2021/006576 (filed on Feb. 22, 2021) under 35 U.S.C. § 371, which claims priority to Japanese Patent Application No. 2020-039882 (filed on Mar. 9, 2020), which are all hereby incorporated by reference in their entirety.

TECHNICAL FIELD

The present technology relates to an image processing apparatus, an image processing method, and a program, and particularly to an image processing apparatus, an image processing method, and a program that are to enable display of an advertisement in an appropriate region within a captured image.

BACKGROUND ART

There has been proposed a technology of detecting movement within a captured moving image (captured image) and displaying an advertisement in a region having less movement than other regions, as a region suitable for advertisement display (see Patent Document 1).

CITATION LIST

Patent Document

Patent Document 1: Japanese Patent Application Laid-Open No. 2016-61885

SUMMARY OF THE INVENTION

Problems to be Solved by the Invention

However, it is desired to display an advertisement more appropriately for the situation of a captured image.

The present technology has been made in view of such a situation, and an object of the present technology is to enable display of an advertisement in an appropriate region within a captured image.

Solutions to Problems

An image processing apparatus according to one aspect of the present technology includes a region setting unit configured to set, on the basis of density of people in a predetermined region within a captured image, an advertisement display region for superimposition of an advertisement image on the captured image.

In one aspect of the present technology, on the basis of density of people in a predetermined region within a captured image, set is an advertisement display region for superimposition of an advertisement image on the captured image.

BRIEF DESCRIPTION OF DRAWINGS

FIG. 11 is an explanatory flowchart illustrating processing of the OTT delivery system.

MODE FOR CARRYING OUT THE INVENTION

Hereinafter, mode for carrying out the present technology will be described. The description will be given in the following order.

0. Overview of Present Technology
1. First Embodiment (TV Broadcast)
2. Second Embodiment (Over The Top (OTT) Delivery)
3. Others

0. Overview of Present Technology (Exemplary Image of Game)

Figure 1:
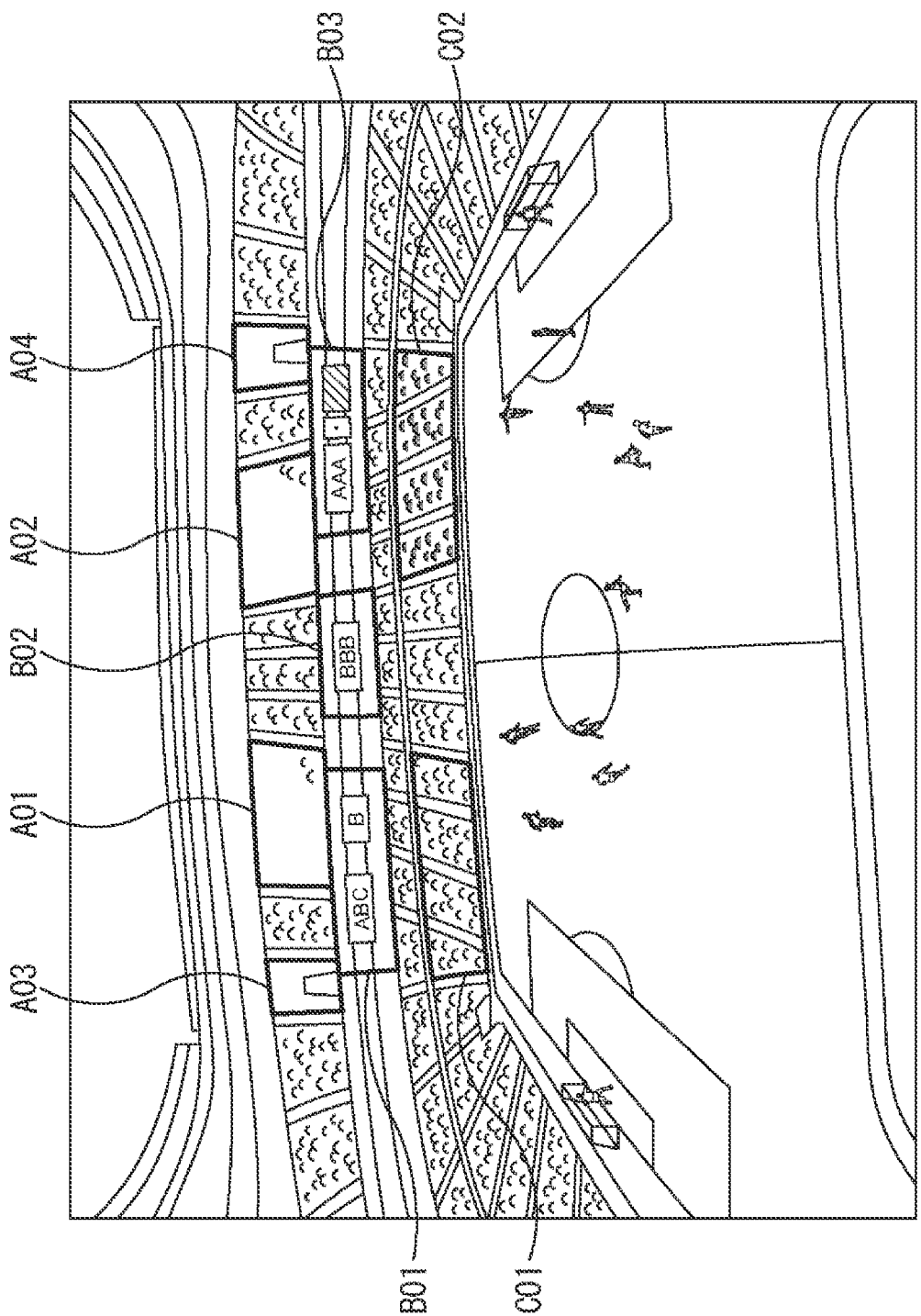
FIG. 1 illustrates an exemplary image of a soccer game captured by a camera.

FIG. 1 illustrates an exemplary image of a soccer game captured by a camera.

In a game venue of sports or the like, as illustrated in FIG. 1, there may be a region A01 and a region A02 with many vacant audience seats. Further, no person is present in a region A03 and a region A04 such as a slope connecting audience seats and the outside in many cases.

Therefore, in the present technology, these regions A01 to A04 having a lower density of people are specified from an image of a game captured by a camera and each set as an advertisement display region for display of an advertisement image.

This arrangement enables effective utilization of a space with lower importance within the image of the game.

Further, in the present technology, an advertisement image to be superimposed on the advertisement display region is determined appropriately.

As illustrated in FIG. 1, each advertisement (including a company logo) of, for example, the game venue or a sponsor of the game is disposed in the corresponding predetermined region (region B01, region B02, or region B03) of the game venue.

In the present technology, an advertisement disposed in the game venue is detected from the image of the game described above, and an advertisement image to be superimposed on an advertisement display region is determined on the basis of the detected advertisement.

Further, as illustrated in FIG. 1, spectators (supporters) wearing T-shirts (uniforms) of each team color are seated in predetermined regions (region C01 and region C02) of audience seats.

In the present technology, team information based on the color of such a uniform is acquired from the color distribution detected from the image of the game described above, and an advertisement image to be superimposed on an advertisement display region is determined on the basis of the acquired team information.

As a result, an advertisement can be dynamically provided for a viewer/listener who views or listens to a game in accordance with, for example, a venue, a team, or a game state.

1. First Embodiment (Television (TV) Broadcast)

(TV Broadcast System)

Figure 2:
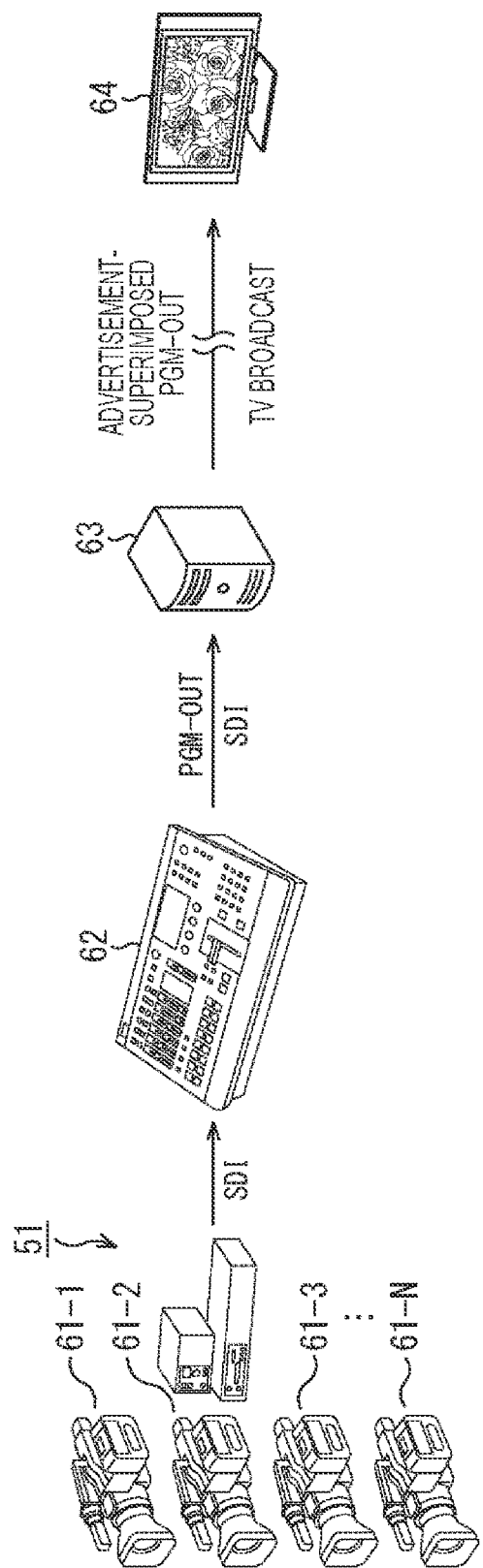
FIG. 2 illustrates an exemplary configuration of a television (TV) broadcast system to which the present technology is applied.

FIG. 2 illustrates an exemplary configuration of a TV broadcast system 51 to which the present technology is applied.

The TV broadcast system 51 includes cameras 61-1 to 61-N, a switcher 62, an analysis/superimposition apparatus 63, and a TV apparatus 64.

The cameras 61-1 to 61-N are disposed in a sports game venue and each capture an image of a sports game. A video server may be connected to the cameras 61-1 to 61-N. The cameras 61-1 to 61-N each output the image of the game captured or an image of the game temporarily accumulated in the video server to the switcher 62 through a serial digital interface (SDI). Hereinafter, in a case where it is not necessary to distinguish the cameras 61-1 to 61-N, they are simply referred to as cameras 61.

The switcher 62 makes a switch between the images (screens) supplied from the cameras 61, and performs editing such as composition of a caption on the switched image. The switcher 62 outputs a program output (PGM-OUT) signal including the edited image to the analysis/superimposition apparatus 63 through an SDI.

The analysis/superimposition apparatus 63 includes a personal computer to be described later with reference to FIG. 3. The analysis/superimposition apparatus 63 analyzes the image in the PGM-OUT signal supplied from the switcher 62 to specify, for example, a vacant space region, and sets the vacant space region as an advertisement display region. Further, on the basis of information acquired from analyzing the image in the PGM-OUT signal, the analysis/superimposition apparatus 63 selects a candidate for an advertisement image to be superimposed on the advertisement display region.

The analysis/superimposition apparatus 63 determines an appropriate advertisement image from among such selected candidates for the advertisement image and superimposes the advertisement image on the advertisement display region of the image. The analysis/superimposition apparatus 63 outputs a PGM-OUT signal including the image with the advertisement image superimposed thereon to the subsequent stage.

The PGM-OUT signal including the image with the advertisement superimposed thereon is transmitted as a TV broadcast signal by a transmission apparatus (not illustrated) or the like.

The TV apparatus 64 receives the PGM-OUT signal as the TV broadcast signal. The TV apparatus 64 outputs the image and audio included in the received signal.

Note that FIG. 2 illustrates an example in which the PGM-OUT signal is supplied from the switcher 62 to the analysis/superimposition apparatus 63; however, an image edited by a camera 61 may be directly supplied to the analysis/superimposition apparatus 63 as a PGM-OUT signal. In this case, the PGM-OUT signal may be supplied through the switcher 62 or may be supplied without the switcher 62.

(Exemplary Configuration of Personal Computer)

Figure 3:
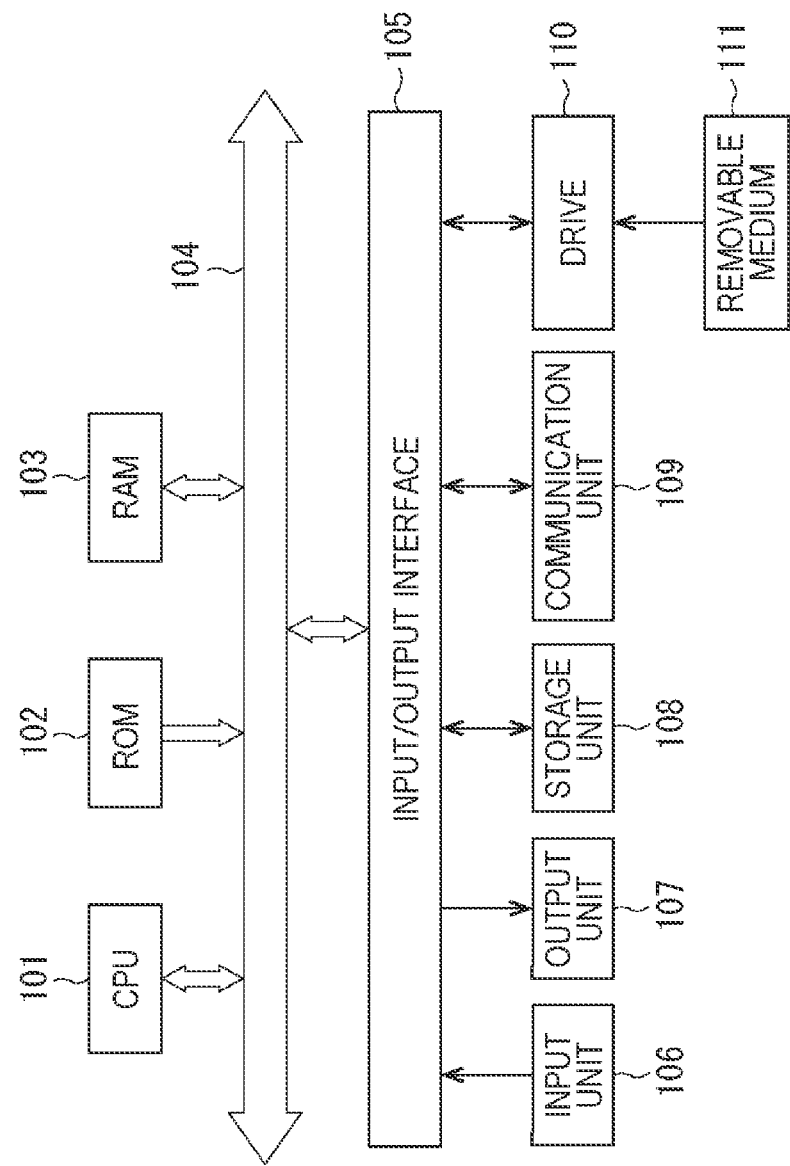
FIG. 3 is a block diagram illustrating an exemplary configuration of a personal computer.

FIG. 3 is a block diagram illustrating an exemplary configuration of a personal computer as the analysis/superimposition apparatus 63.

In FIG. 3, the personal computer includes a central processing unit (CPU) 101, a read only memory (ROM) 102, and a random access memory (RAM) 103. The CPU 101, the ROM 102, and the RAM 103 are mutually connected through a bus 104.

Further, an input/output interface 105 is connected to the bus 104. An input unit 106 including a keyboard and a mouse and an output unit 107 including a display and a speaker are connected to the input/output interface 105.

Furthermore, a storage unit 108 including a hard disk and a non-volatile memory, a communication unit 109 including a network interface, and a drive 110 that drives a removable medium 111 are connected to the input/output interface 105.

(Exemplary Functional Configuration of Analysis/Superimposition Apparatus)

Figure 4:
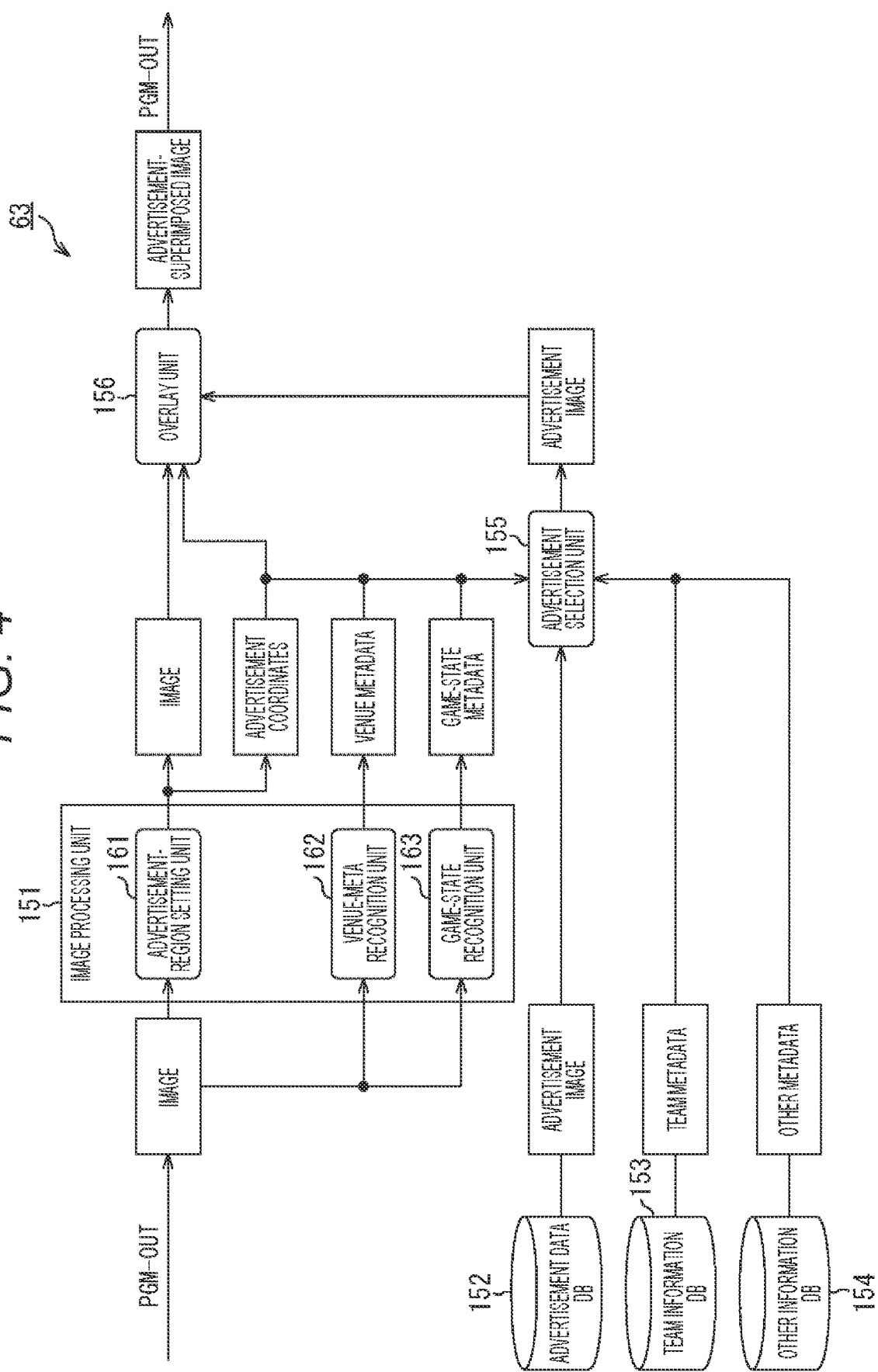
FIG. 4 is a block diagram illustrating an exemplary functional configuration of an analysis/superimposition apparatus.

FIG. 4 is a block diagram illustrating an exemplary functional configuration of the analysis/superimposition apparatus. For example, these functional blocks are performed resulting from decompression of a program stored in the storage unit 108 in FIG. 3 by the CPU 101 into the RAM 102 through the input/output interface 105 and the bus 104.

In FIG. 4, the analysis/superimposition apparatus 63 includes an image processing unit 151, an advertisement data database (DB) 152, a team information DB 153, other information DB 154, an advertisement selection unit 155, and an overlay unit 156.

The image processing unit 151 analyzes the image included in the PGM-OUT signal of the game supplied from the switcher 62, and performs image-information detection processing of detecting image information such as a vacant space region, in-venue information, and a game state. The image processing unit 151 includes an advertisement-region setting unit 161, a venue-meta recognition unit 162, and a game-state recognition unit 163.

Each frame of image included in the PGM-OUT signal supplied from the switcher 62 is input to the advertisement-region setting unit 161, the venue-meta recognition unit 162, and the game-state recognition unit 163.

The advertisement-region setting unit 161 specifies a vacant space region (e.g., regions A01 to A04 in FIG. 1) including a vacant audience seat from the image.

Specifically, the advertisement-region setting unit 161 first recognizes an image from the image by image analysis, for example, by manual or with machine learning, and detects an audience seat region. The advertisement-region setting unit 161 specifies a vacant space region having a lower density of people from the detected audience seat region by such a technique as described below. Note that the audience seat region may also include a region where a bench on which players stand by is disposed.

For example, the advertisement-region setting unit 161 specifies such a vacant space region from the audience seat region in response to a manual instruction by the user. Alternatively, for example, the advertisement-region setting unit 161 applies a human detection algorithm to the entire audience seat region, and detects, as a vacant space region, a region where the density of people is lower and people are hardly recognized (e.g., region with many vacant audience seats) and a region having an area not less than a certain area. Alternatively, the advertisement-region setting unit 161 specifies, as a vacant space region, a region that has an area not less than a certain area and is less in color variation. The seat colors of the audience seats are often the same. Thus, in a case where the audience seats in a predetermined region are vacant, the predetermined region is a region less in color variation because the seat colors are detected from the predetermined region.

The advertisement-region setting unit 161 outputs each frame of image to the overlay unit 156. Further, the advertisement-region setting unit 161 sets the specified vacant space region as an advertisement display region, and outputs the coordinates information of the advertisement display region to the advertisement selection unit 155 and the overlay unit 156.

From the image, the venue-meta recognition unit 162 recognizes the position and details of an advertisement disposed within the venue as in-venue information, by image analysis with, for example, machine learning. The venue-meta recognition unit 162 outputs, as venue metadata, the information regarding the position and details of the advertisement acquired from the image recognition to the advertisement selection unit 155.

The game-state recognition unit 163 recognizes a game state including information regarding a team and a player from the image by image analysis. The game-state recognition unit 163 outputs, as game-state metadata, the game state acquired from the image recognition to the advertisement selection unit 155.

Specifically, from the color distribution of the region where people are recognized due to the human detection by the advertisement-region setting unit 161, the game-state recognition unit 163 recognizes the uniform colors and the team colors to detect the respective regions (e.g., audience seats or benches) of the home team and the away team within the venue.

The game-state recognition unit 163 performs skeletal recognition by image analysis, and recognizes a motion such as fist pump from the image to detect, for example, a moment at which a player scored or the like. Further, for example, the game-state recognition unit 163 recognizes a team to which each player belongs on the basis of the uniform color or the like, and recognizes each player on the basis of the uniform number or the like.

In a case where a caption is combined with the image, the game-state recognition unit 163 recognizes the caption within the image. For example, a moment at which a player scored is detected due to recognition of a caption "Goal!!".

In the advertisement data DB 152, advertisement data regarding a sponsor of a venue or a game or a product of the sponsor is registered. Further, advertisement data regarding a sponsor of a team or a player or a product of the sponsor is registered.

In the team information DB 153, various pieces of data regarding teams such as information regarding the players of each team, the team color, and data regarding the team uniform are registered.

Other metadata different from the above are registered in the other information DB 154.

The advertisement selection unit 155 acquires the coordinates information of the advertisement display region supplied from the advertisement-region setting unit 161. The advertisement selection unit 155 acquires the venue metadata from the venue-meta recognition unit 162, and acquires the game-state metadata supplied from the game-state recognition unit 163. Further, the advertisement selection unit 155 acquires the team metadata registered in the team information DB 153, and acquires the other metadata registered in the other information DB 154 as necessary.

On the basis of each piece of the acquired metadata, the advertisement selection unit 155 selects, from among advertisement images registered in the advertisement data DB 152, a candidate for an advertisement image (hereinafter, referred to as an advertisement image candidate) to be superimposed on the advertisement display region in the coordinates information supplied from the advertisement-region setting unit 161.

For example, the advertisement selection unit 155 selects an advertisement image corresponding to the home team and an advertisement image corresponding to the away teams as advertisement image candidates on the basis of the game-state metadata.

For example, the advertisement selection unit 155 selects an advertisement image of a sponsor of a team or a player as an advertisement image candidate on the basis of the game-state metadata.

For example, the advertisement selection unit 155 selects an advertisement image related to an advertisement present in the venue as an advertisement image candidate on the basis of the venue metadata.

For example, the advertisement selection unit 155 selects an advertisement image corresponding to a game state as an advertisement image candidate on the basis of the game-state metadata. Specifically, an advertisement image corresponding to a player who played, for example, when the player scored or when a nice play was made, is selected as an advertisement image candidate.

For example, the advertisement selection unit 155 selects an advertisement image candidate in accordance with an aspect ratio, for example, whether the shape of the advertisement display region is laterally elongate or longitudinally elongate.

The advertisement selection unit 155 further determines an advertisement image to be actually superimposed on the advertisement display region from among such selected advertisement image candidates. As the determination method, any of the above methods for selecting an advertisement image candidate may be used, or may be used on a random basis. The advertisement selection unit 155 outputs the determined advertisement image to the overlay unit 156. Note that the advertisement image may be determined by the overlay unit 156.

On the basis of the coordinates information of the advertisement display region supplied from the advertisement-region setting unit 161, the overlay unit 156 superimposes the advertisement image supplied from the advertisement selection unit 155 on the image supplied from the advertisement-region setting unit 161. The overlay unit 156 outputs a PGM-OUT signal including the image with the advertisement image superimposed thereon to the subsequent stage.

Note that the advertisement data DB 152, the team information DB 153, and the other information DB 154 may be each provided in an external server. In that case, the advertisement selection unit 155 acquires data of each DB through the communication unit 109 in FIG. 3.

(Operation of Analysis/Superimposition Apparatus)

Figure 5:
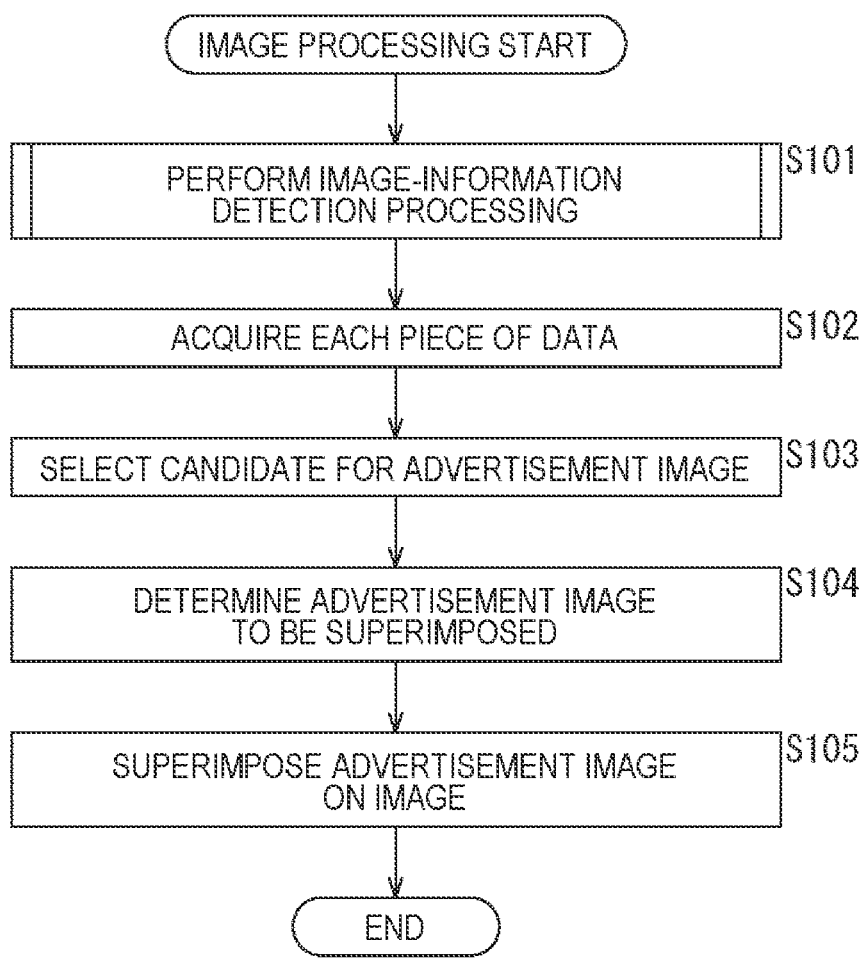
FIG. 5 is an explanatory flowchart illustrating image processing of the analysis/superimposition apparatus.

FIG. 5 is an explanatory flowchart illustrating image processing of the analysis/superimposition apparatus 63.

In step S101, the image processing unit 151 performs image-information detection processing on an image included in a PGM-OUT signal supplied from the switcher 62. The details of the image-information detection processing will be described later with reference to FIG. 6. Resulting from the processing in step S101, the coordinates information of an advertisement display region, venue metadata, and game-state metadata are output to the advertisement selection unit 155.

In step S102, the advertisement selection unit 155 acquires each piece of data.

The advertisement selection unit 155 acquires the coordinates information of the advertisement display region supplied from the advertisement-region setting unit 161. The advertisement selection unit 155 acquires the venue metadata from the venue-meta recognition unit 162, and acquires the game-state metadata supplied from the game-state recognition unit 163. Further, the advertisement selection unit 155 acquires team metadata registered in the team information DB 153, and acquires other metadata registered in the other information DB 154 as necessary.

In step S103, on the basis of each piece of the acquired metadata, the advertisement selection unit 155 selects a candidate for an advertisement image (advertisement image candidate) to be superimposed on the advertisement display region from among advertisement images registered in the advertisement data DB 152.

In step S104, the advertisement selection unit 155 further determines an advertisement image to be actually superimposed on the advertisement display region from among such selected advertisement image candidates. The advertisement selection unit 155 outputs the determined advertisement image to the overlay unit 156.

In step S105, on the basis of the coordinates information of the advertisement display region supplied from the advertisement-region setting unit 161, the overlay unit 156 superimposes the advertisement image supplied from the advertisement selection unit 155 on an image supplied from the advertisement-region setting unit 161. The overlay unit 156 outputs a PGM-OUT signal including the image with the advertisement image superimposed thereon to the subsequent stage.

Figure 6:
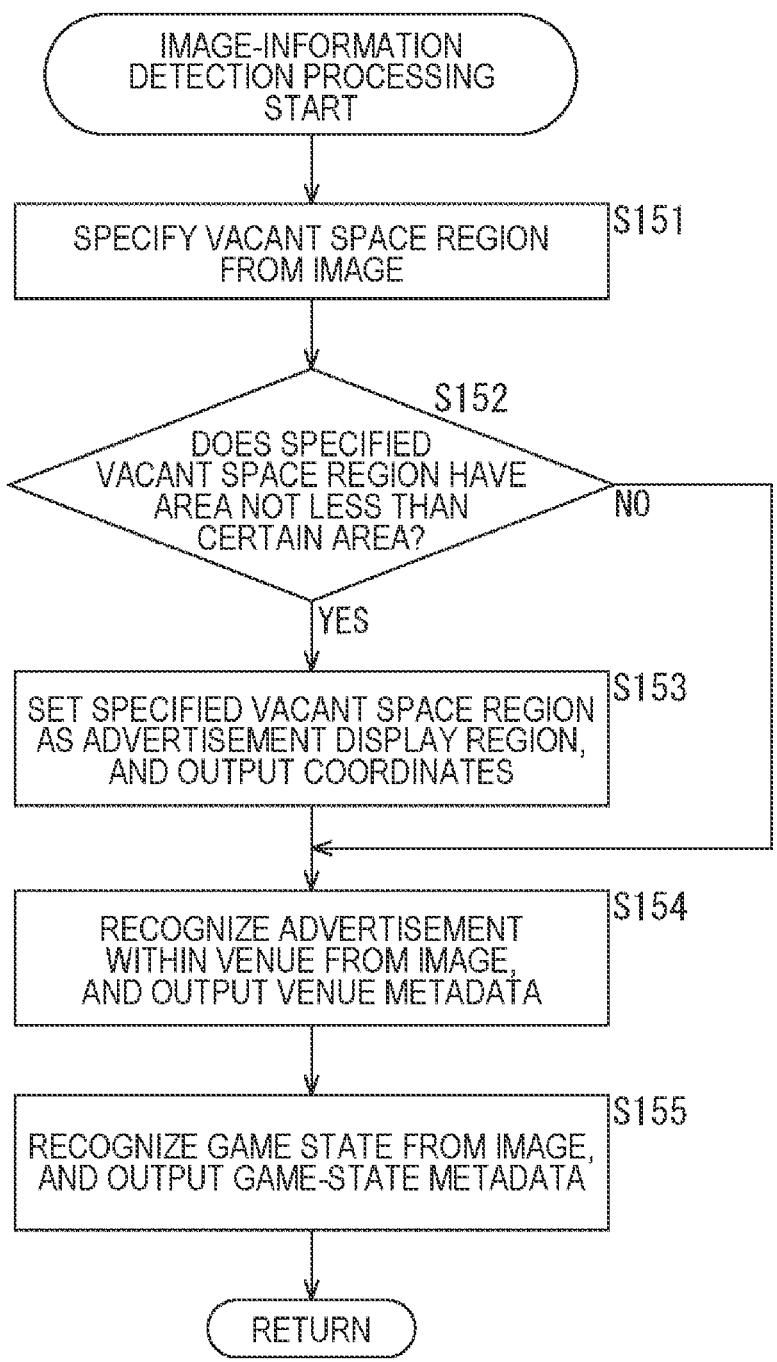
FIG. 6 is an explanatory flowchart illustrating image-information detection processing in step S101 of FIG. 5.

FIG. 6 is an explanatory flowchart illustrating the image-information detection processing in step S101 of FIG. 5.

In step S151, the advertisement-region setting unit 161 specifies a vacant space region (e.g., regions A01 to A04 in FIG. 1) from the image by, for example, image analysis.

In step S152, the advertisement-region setting unit 161 determines whether or not the specified vacant space region has an area not less than a certain area. In a case where it is determined in step S152 that the specified vacant space region has an area not less than a certain area, the processing goes to step S153.

In step S153, the advertisement-region setting unit 161 sets the specified vacant space region as an advertisement display region, and outputs the coordinates information of the advertisement display region to the advertisement selection unit 155 and the overlay unit 156. Then, the processing goes to step S154.

In a case where it is determined in step S152 that the specified vacant space region has an area less than a certain area, the processing in step S153 is skipped, and the processing goes to step S154.

In step S154, the venue-meta recognition unit 162 recognizes, as in-venue information, the position and details of an advertisement disposed within the venue from the image by image analysis with, for example, machine learning. The venue-meta recognition unit 162 outputs, as venue metadata, the information regarding the position and details of the advertisement acquired from the image recognition to the advertisement selection unit 155.

In step S155, the game-state recognition unit 163 recognizes a game state including information regarding a team and a player from the image by, for example, image analysis. The game-state recognition unit 163 outputs, as game-state metadata, the game state acquired from the image recognition to the advertisement selection unit 155.

(Exemplary Advertisement Superimposition)

Figure 7:
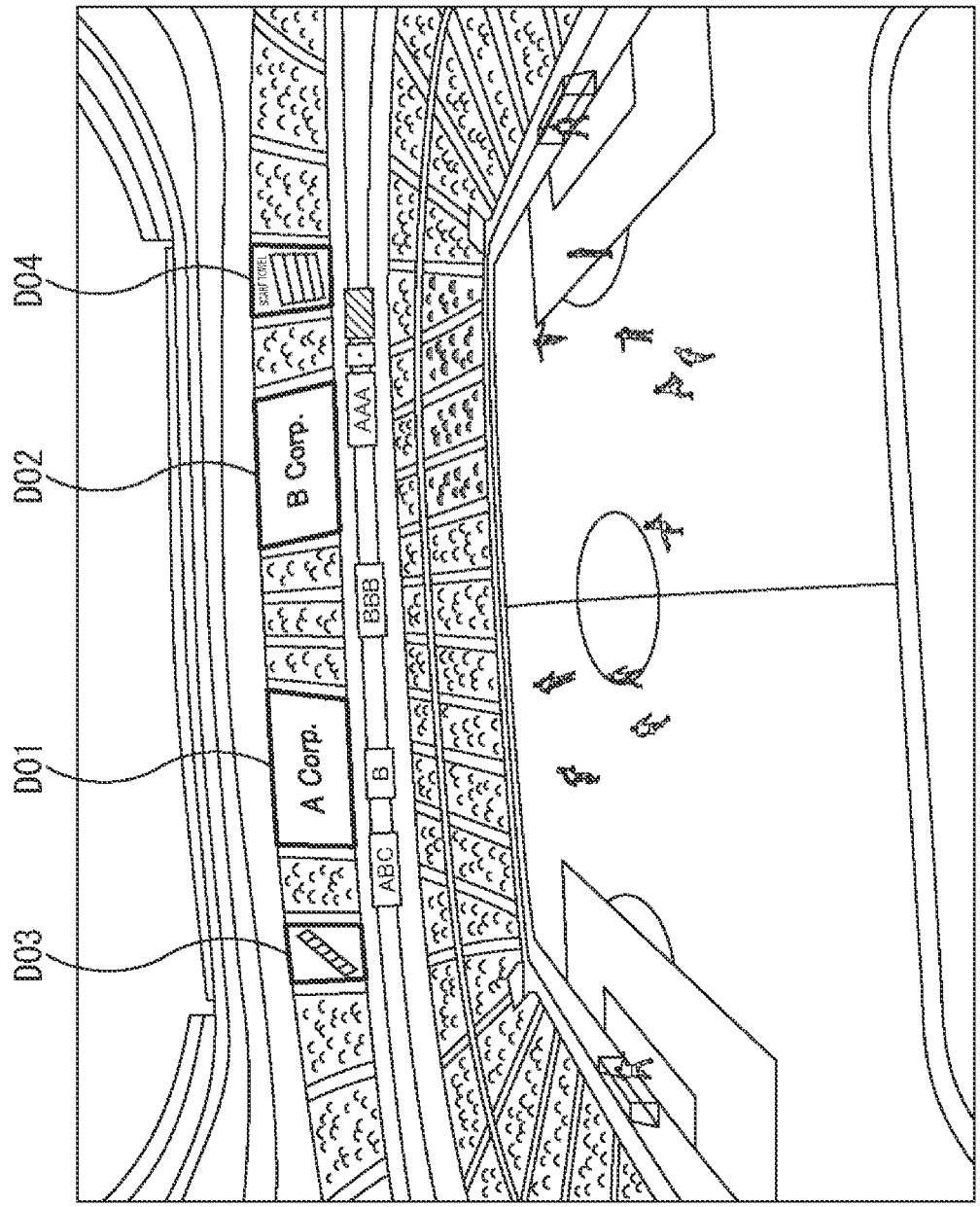
FIG. 7 illustrates exemplary superimposition of an advertisement image on an advertisement display region.

FIG. 7 illustrates exemplary superimposition of an advertisement image on an advertisement display region.

FIG. 7 illustrates an image with each advertisement image superimposed on the corresponding advertisement display region set in the image of FIG. 1.

For example, an advertisement image of "A Corp." as a sponsor of the game is superimposed on an advertisement display region D01 (region A01 in FIG. 1). An advertisement image of "B Corp." as a sponsor of the venue is superimposed on an advertisement display region D02 (region A02 in FIG. 1).

The advertisement of "B Corp." is also actually disposed in the venue. However, for example, in a case where the advertisement of "B Corp." disposed in the venue comes out of the angle of view of a camera in change of the shooting range thereof, the advertisement image of "B Corp." is superimposed on the advertisement display region D02. This arrangement enables fair advertisement for the sponsor.

For these advertisement images, for example, advertisement images close in aspect ratio (laterally elongate) to the advertisement display region D01 and the advertisement display region D02 from among advertisement image candidates are determined. The advertisement images are deformed in accordance with the respective shapes and sizes of the advertisement display region D01 and the advertisement display region D02.

An advertisement image corresponding to the home team is superimposed on an advertisement display region D03 (region A03 in FIG. 1). An advertisement image corresponding to the away team is superimposed on an advertisement display region D04 (region A04 in FIG. 1). For example, the respective regions (e.g., audience seats or benches) of the home team and the away team within the venue are detected by the game-state recognition unit 163, and an advertisement image corresponding to each team is superimposed on the corresponding advertisement display region close to the region of the team.

For these advertisement images, for example, advertisement images close in aspect ratio (height:width=1:1) to the advertisement display region D03 and the advertisement display region D04 from among the advertisement image candidates are determined. The advertisement images are deformed in accordance with the respective shapes and sizes of the advertisement display region D03 and the advertisement display region D04.

Figure 8:
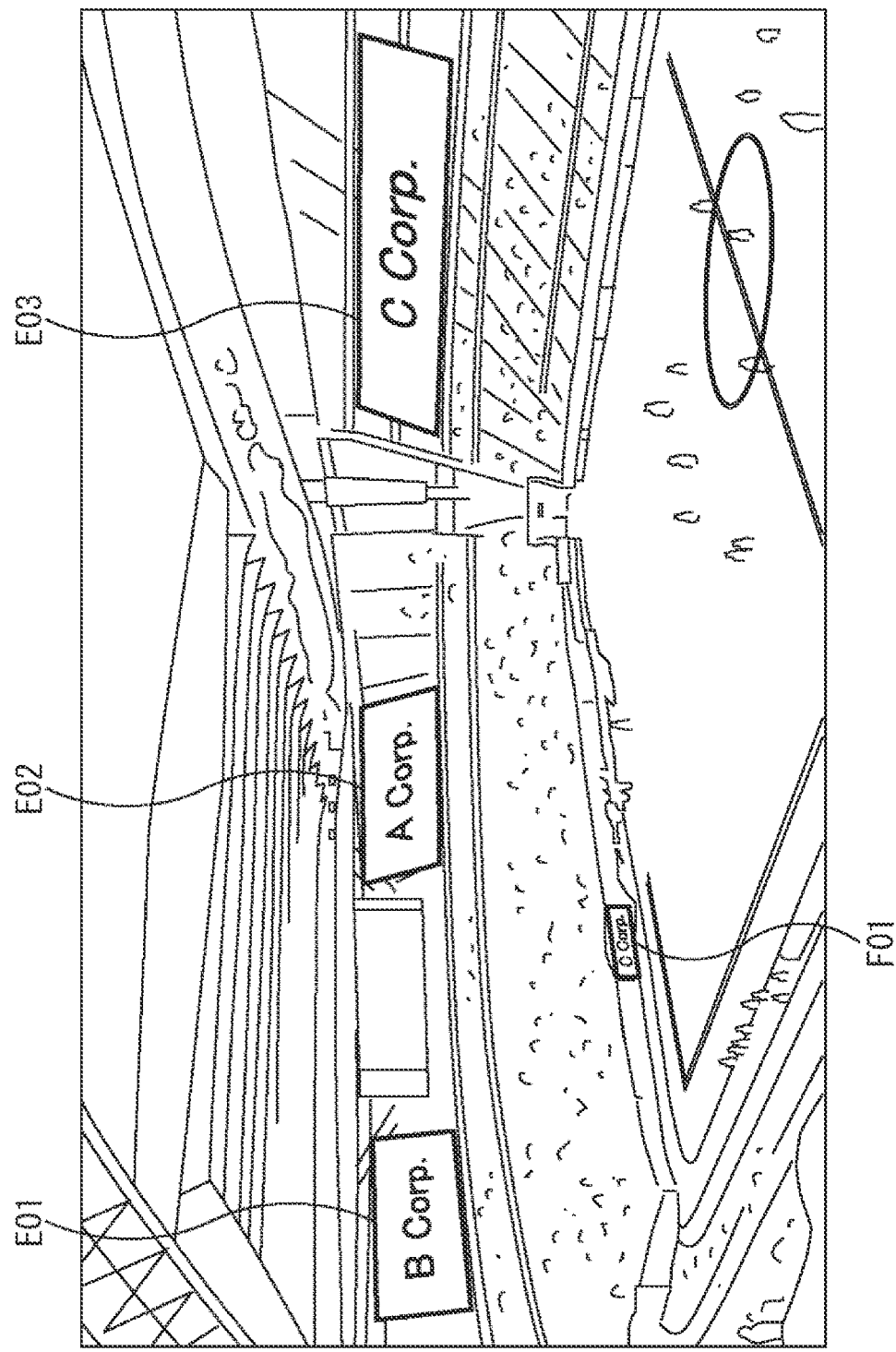
FIG. 8 illustrates exemplary superimposition of an advertisement image on an advertisement display region.

FIG. 8 illustrates different exemplary superimposition of an advertisement image on an advertisement display region.

FIG. 8 illustrates an image with an advertisement image superimposed on an advertisement display region set in an image of another soccer game captured by a camera.

In the image of the table tennis game, no spectators are present on the audience seats, and the entire audience seats are set as advertisement display regions E01 to E03.

Further, an advertisement image of "A Corp." as a sponsor of the game is superimposed on the advertisement display region E01. An advertisement image of "B Corp." as a sponsor of the venue is superimposed on the advertisement display region E02. An advertisement image of "C Corp." as a sponsor of the venue is superimposed on the advertisement display region E03.

Note that the advertisement images are deformed in accordance with the advertisement display regions E01 to E03 so as to be superimposed on the advertisement display regions E01 to E03.

Further, for example, an advertisement F01 disposed in the game venue is detected from the image of the soccer game in FIG. 8, and venue metadata including "C Corp." as the sponsor of the venue is output to the advertisement selection unit 155. Then, because the size of the advertisement F01 of "C Corp." is smaller, the advertisement image of "C Corp." is determined by the advertisement selection unit 155 as an advertisement image to be superimposed on the advertisement display region E03, on the basis of the venue metadata. As a result, the advertisement of "C Corp." as the sponsor of the venue is displayed in a larger size.

As described above, in a case where audience seats have a lower density of people and are almost vacant, such an advertisement image may be superimposed on the entire audience seats.

Note that, not limited to the audience seats, for example, because the density of people of each object region such as a ceiling, a lighting device, or a pillar of a venue is substantially equal to zero, the object region may also be set as an advertisement display region in a case where the object region has an area not less than a certain area.

2. Second Embodiment (Over The Top (OTT) Delivery)

(OTT Delivery System)

Figure 9:
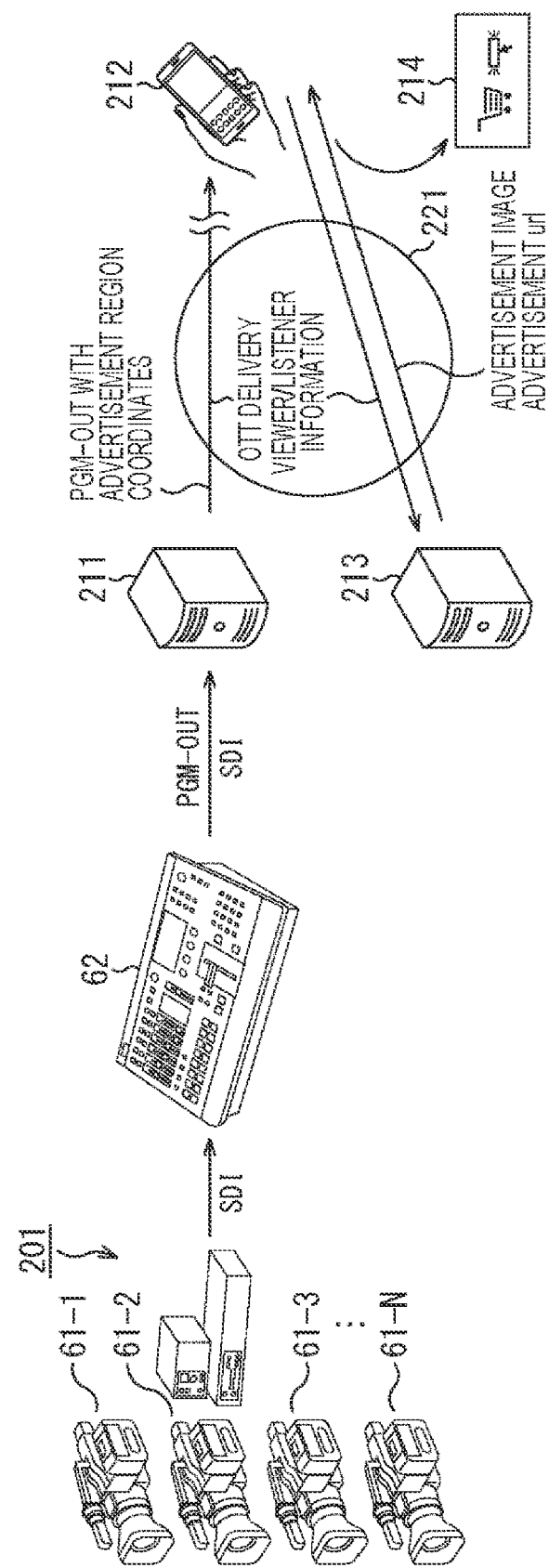
FIG. 9 illustrates an exemplary configuration of an over the top (OTT) delivery system to which the present technology is applied.

FIG. 9 illustrates an exemplary configuration of an over the top (OTT) delivery system 201 to which the present technology is applied.

In FIG. 9, the OTT delivery system 201 includes cameras 61-1 to 61-N, a switcher 62, an analysis apparatus 211, a user terminal 212, an advertisement server 213, and an electronic commerce (EC) server 214. Parts corresponding to those in FIG. 2 are denoted with the same reference signs, and thus the description will not be given.

Further, the analysis apparatus 211, the user terminal 212, the advertisement server 213, and the EC server 214 are connected through an Internet 221.

The switcher 62 outputs a PGM-OUT signal including an edited image to the analysis apparatus 211 through an SDI.

Similarly to the analysis/superimposition apparatus 63 in FIG. 2, the analysis apparatus 211 includes a personal computer. The analysis apparatus 211 analyzes the image included in the PGM-OUT signal supplied from the switcher 62 to specify, for example, a vacant space region, and sets the vacant space region as an advertisement display region.

The analysis apparatus 211 OTT-delivers, to the user terminal 212, a PGM-OUT signal with advertisement region coordinates including an image to which the coordinates information of the advertisement display region is added. In addition to the vacant space region, the analysis apparatus 211 also detects in-venue information and image information (metadata acquired from the image) such as a game state, and adds the detected information to the PGM-OUT signal with the advertisement region coordinates to transmit the added PGM-OUT signal with the advertisement region coordinates.

Note that the in-venue information and the image information such as the game state may be directly transmitted from the analysis apparatus 211 to the advertisement server 213.

The user terminal 212 includes a tablet terminal or a mobile terminal such as a smartphone. The user terminal 212 receives the PGM-OUT signal with the advertisement region coordinates. The user terminal 212 transmits the coordinates information of the advertisement region, the metadata acquired from the image, and viewer/listener information stored in itself to the advertisement server 213.

The user terminal 212 receives an advertisement image that is transmitted from the advertisement server 213 and an advertisement uniform resource locator (URL) that is transmitted as necessary. The advertisement URL is a URL of a page on which a product of the advertisement image is purchasable on an EC site constructed in the EC server 214.

The user terminal 212 superimposes the advertisement image and the advertisement URL received from the advertisement server 213 on the image included in the PGM-OUT signal received from the analysis apparatus 211 and displays the superimposed image. In a case where the advertisement image is clicked in response to a user operation, the user terminal 212 displays the page of the EC site of the EC server 214 indicated by the advertisement URL.

Similarly to the analysis/superimposition apparatus 63 in FIG. 2, the advertisement server 213 includes a personal computer. The advertisement server 213 receives the coordinates information of the advertisement region, the metadata acquired from the image, and the viewer/listener information transmitted from the user terminal 212.

On the basis of the received information, the advertisement server 213 selects a candidate for an advertisement image (advertisement image candidate) to be superimposed on the advertisement display region of the image included in the PGM-OUT signal. The advertisement server 213 determines an appropriate advertisement image from among such advertisement image candidates and transmits the advertisement image to the user terminal 212. At this time, the advertisement server 213 also transmits the advertisement URL to the user terminal 212 as necessary.

Similarly to the analysis/superimposition apparatus 63 in FIG. 2, the EC server 214 includes a personal computer. The EC server 214 transmits, to the user terminal 212, information regarding the page of the EC site requested on the advertisement URL from the user terminal 212. The EC server 214 sells a product of the advertisement in accordance with an instruction from the user terminal 212.

(Exemplary Functional Configurations of Analysis Apparatus, User Terminal, and Advertisement Server)

Figure 10:
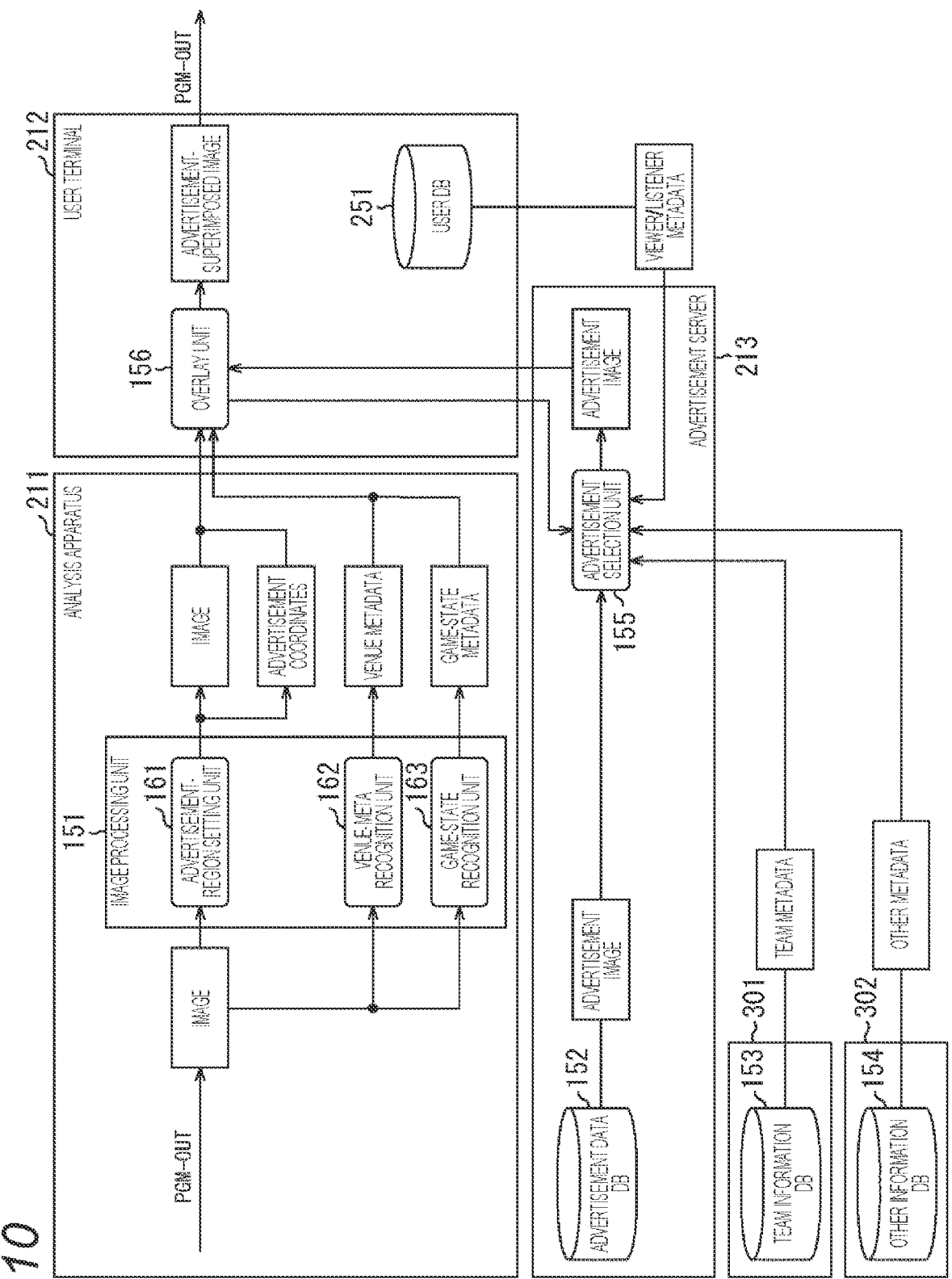
FIG. 10 is a block diagram illustrating exemplary functional configurations of an analysis apparatus, a mobile terminal, and an advertisement server.

FIG. 10 is a block diagram illustrating exemplary functional configurations of the analysis apparatus 211, the user terminal 212, and the advertisement server 213. For example, these functional blocks of each apparatus are each achieved resulting from decompression of a program stored in the storage unit 108 of the apparatus (FIG. 3) by the CPU 101 into the RAM 102 through the input/output interface 105 and the bus 104.

FIG. 10 illustrates the analysis apparatus 211, the user terminal 212, the advertisement server 213, a team information server 301, and an information server 302, as the OTT delivery system 201.

In the OTT delivery system 201, as illustrated in FIG. 10, each unit of such an analysis/superimposition apparatus 63 as in FIG. 4 is separately disposed in the analysis apparatus 211, the user terminal 212, the advertisement server 213, the team information server 301, and the information server 302. Parts corresponding to those in FIG. 4 are denoted with the same reference signs, and thus the description will not be given. Further, transmission and reception between the apparatuses are performed, for example, by such a communication unit 109 as in FIG. 3 through the Internet 221.

The analysis apparatus 211 includes such an image processing unit 151 including an advertisement-region setting unit 161, a venue-meta recognition unit 162, and a game-state recognition unit 163 as in FIG. 4.

The advertisement-region setting unit 161 transmits a PGM-OUT signal with advertisement region coordinates to the user terminal 212.

The venue-meta recognition unit 162 transmits venue metadata to the user terminal 212. The game-state recognition unit 163 transmits game-state metadata to the user terminal 212.

The user terminal 212 includes such an overlay unit 156 as in FIG. 4 and a user DB 251.

The overlay unit 156 transmits the coordinates information of an advertisement display region, the venue metadata, and the game-state metadata transmitted from the analysis apparatus 211 to the advertisement server 213.

On the basis of the coordinates information of the advertisement display region transmitted from the analysis apparatus 211, the overlay unit 156 superimposes an advertisement image transmitted from the advertisement server 213 on an image in the PGM-OUT signal with the advertisement region coordinates transmitted from the analysis apparatus 211. The overlay unit 156 outputs a PGM-OUT signal including the image with the advertisement image superimposed thereon to the subsequent stage.

In the user DB 251, preference information regarding a user is registered.

The advertisement server 213 includes such an advertisement data DB 152 and an advertisement selection unit 155 as in FIG. 4. The team information server 301 includes such a team information DB 153 as in FIG. 4. The information server 302 includes such other information DB 154 as in FIG. 4.

The advertisement selection unit 155 acquires the coordinates information of the advertisement display region, the venue metadata, and the game-state metadata transmitted from the user terminal 212. Further, the advertisement selection unit 155 acquires viewer/listener metadata registered in the user DB 251 from the user terminal 212. The advertisement selection unit 155 acquires team metadata registered in the team information DB 153 from the team information server 301 and acquires other metadata registered in the other information DB 154 from the information server 302 as necessary.

On the basis of each piece of the acquired metadata, the advertisement selection unit 155 selects, from among advertisement images registered in the advertisement data DB 152, a candidate for an advertisement image (advertisement image candidate) to be superimposed on the advertisement display region in the coordinates information transmitted from the user terminal 212.

In addition to the above method described, for example, the advertisement selection unit 155 selects an advertisement image corresponding to the preference of a viewer/listener as an advertisement image candidate on the basis of the viewer/listener metadata. Specifically, the advertisement selection unit 155 selects, as a candidate for an advertisement image to be displayed, for example, during a break time, an advertisement image corresponding to the preference of the viewer/listener as an advertisement image candidate.

The advertisement selection unit 155 further determines an advertisement image to be actually superimposed on the advertisement display region from among such selected advertisement image candidates. The advertisement selection unit 155 outputs the determined advertisement image to the user terminal 212. The advertisement selection unit 155 also transmits the advertisement URL registered in the advertisement data DB 152 in association with the advertisement image to the user terminal 212.

(Operation of OTT Delivery System)

FIG. 11 is an explanatory flowchart illustrating processing of the OTT delivery system 201.

In step S201, the analysis apparatus 211 performs such image-information detection processing as described above with reference to FIG. 6 on an image included in a PGM-OUT signal supplied from the switcher 62.

In step S202, the analysis apparatus 211 transmits a PGM-OUT signal with advertisement region coordinates, venue metadata, and game-state metadata to the user terminal 212.

In step S241, the user terminal 212 receives the PGM-OUT signal with the advertisement region coordinates and each piece of data transmitted from the analysis apparatus 211.

In step S242, the user terminal 212 transmits each piece of data (the coordinates information of the advertisement display region and each piece of metadata) received from the analysis apparatus 211 and viewer/listener metadata to the advertisement server 213.

In step S221, the advertisement server 213 receives each piece of data transmitted from the user terminal 212. At this time, the advertisement server 213 also acquires team metadata and other metadata as necessary.

In step S222, on the basis of each piece of the acquired metadata, the advertisement server 213 selects, from among advertisement images registered in the advertisement data DB 152, a candidate for an advertisement image (advertisement image candidate) to be superimposed on the advertisement display region supplied from the advertisement-region setting unit 161.

In step S223, the advertisement server 213 further determines an advertisement image to be actually superimposed on the advertisement display region from among such selected advertisement image candidates.

In step S224, the advertisement server 213 transmits the determined advertisement image and its advertisement URL to user terminal 212.

In step S243, the user terminal 212 receives the advertisement image and its advertisement URL transmitted from the advertisement server 213.

In step S244, on the basis of the advertisement region coordinates, the user terminal 212 superimposes the advertisement image on the image included in the PGM-OUT signal.

In step S245, the user terminal 212 outputs a PGM-OUT signal including the image with the advertisement image superimposed thereon.

Note that, as described above, on the user terminal 212, in response to clicking, by the user, the advertisement image superimposed on the image, the page moves to a page on which a product indicated by the advertisement URL is purchasable.

3. Others (Effects)

Conventionally, for example, in the technology described in Patent Document 1 described above, there has been a case where the entire audience seats become an advertisement region because the movement of the entire audience seats is smaller originally. In this case, although the expression and movement of the spectators are essential for producing the excitement of the game, the expression and movement of the spectators have been deleted by the advertisement.

In addition, in a case where the field for playing the game is wide or in a case where the game is temporarily stopped, even the field with a player has become an advertisement region.

In the present technology, an advertisement display region for superimposition of an advertisement image on an image is set on the basis of the density of people in a predetermined region within an image including a game captured.

This arrangement enables effective utilization of an appropriate region within the image of the game.

Further, this arrangement enables dynamic presentation of an advertisement to a viewer/lister in accordance with, for example, a venue, a team, or a game state.

Note that the present technology is applicable not only to sports games but also to specific events such as a music live show, a talk show, and a lecture.

The above flow of processing can be performed with hardware or software. In a case where the above flow of processing is performed with software, a program included in the software is installed from a program recording medium onto, for example, a computer embedded in dedicated hardware or a general-purpose personal computer.

Note that the program executed by the computer may be a program for chronologically performing the processing in accordance with the order described in the present specification, may be a program for parallelly performing the processing, or a program for performing the processing with necessary timing, for example, when a call is made.

Note that, in the present specification, the system means a collection of a plurality of constituent elements (apparatuses, modules (components), and others). Thus, it is not concerned whether or not all the constituent elements are included in the same casing. Therefore, a plurality of apparatuses housed in separate casings and connected through a network, and a single apparatus having a plurality of modules housed in a single casing are both systems.

Further, the effects described in the present specification are merely exemplified and are not intended to be limitative, and may have additional effects.

Embodiments of the present technology are not limited to the above embodiments, and various modifications can be made without departing from the gist of the present technology.

For example, the present technology can adopt a configuration of cloud computing in which a single function is subjected to processing by sharing and collaborating between a plurality of apparatuses through a network.

Further, each step described in the above flowcharts can be performed by a single apparatus, or can be performed by sharing among a plurality of apparatuses.

Furthermore, in a case where a plurality of pieces of processing is included in a single step, the plurality of pieces of processing included in the single step can be performed by a single apparatus, or can be performed by sharing among a plurality of apparatuses.

<Exemplary Configuration Combinations>

The present technology can also adopt the following configurations.

(1)

An image processing apparatus including:
a region setting unit configured to set, on the basis of density of people in a predetermined region within a captured image, an advertisement display region for superimposition of an advertisement image on the captured image.

(2)

The image processing apparatus according to (1) described above,
in which in a case where a region specified on the basis of the density of people within the predetermined region has an area not less than a certain area, the region setting unit sets the specified region as the advertisement display region.

(3)

The image processing apparatus according to (2) described above,
in which the captured image corresponds to an image including a specific event captured, and
the predetermined region corresponds to an object region related to the specific event.

(4)

The image processing apparatus according to (3) described above,
in which the object region corresponds to an audience seat region.

(5)

The image processing apparatus according to (4) described above,
in which the specified region corresponds to a region with many vacant audience seats.

(6)

The image processing apparatus according to (1) or (2) described above, further including:
an advertisement selecting unit configured to select, on the basis of a result of analysis of the captured image, a candidate for the advertisement image to be superimposed on the advertisement display region.

(7)

The image processing apparatus according to (6) described above,
in which the captured image corresponds to an image including a game captured, and
the advertisement selecting unit selects the candidate for the advertisement image on the basis of information regarding a team playing the game, the information being acquired from analysis of the captured image.

(8)

The image processing apparatus according to (7) described above,
in which the information regarding the team corresponds to information regarding respective regions of a home team and an away team within a venue.

(9)

The image processing apparatus according to (6) described above,
in which the captured image corresponds to an image including a specific event captured, and
the advertisement selecting unit selects the candidate for the advertisement image on the basis of information regarding a sponsor of the specific event.

(10)

The image processing apparatus according to (6) described above, in which the captured image corresponds to an image including a specific event captured, and the advertisement selecting unit selects the candidate for the advertisement image on the basis of an advertisement disposed in a venue of the specific event, the advertisement being detected by analysis of the captured image.

(11)

The image processing apparatus according to (10) described above, in which, as the advertisement image to be superimposed on the advertisement display region, the advertisement selecting unit determines, from among the candidates for the advertisement image, an advertisement image of a sponsor of an advertisement among the advertisements disposed in the venue of the specific event, the advertisement having not been detected from the captured image.

(12)

The image processing apparatus according to (6) described above, in which the captured image corresponds to an image including a specific event captured, and the advertisement selecting unit selects the candidate for the advertisement image on the basis of a state of the specific event acquired from analysis of the captured image.

(13)

The image processing apparatus according to (6) described above, in which the advertisement selecting unit selects the candidate for the advertisement image in accordance with a shape of the advertisement display region.

(14)

The image processing apparatus according to any of (6) to (13) described above, further including:

a superimposition unit configured to superimpose, on the captured image, the advertisement image determined from among the candidates for the advertisement image.

(15)

An image processing method to be performed by an image processing apparatus, the image processing method including:

setting, on the basis of density of people in a predetermined region within a captured image, an advertisement display region for superimposition of an advertisement image on the captured image.

(16)

A program for causing a computer to function as:

a region setting unit configured to set, on the basis of density of people in a predetermined region within a captured image, an advertisement display region for superimposition of an advertisement image on the captured image.

REFERENCE SIGNS LIST

51 TV broadcast system
61, 61-1 to 61-N Camera
62 Switcher
63 Analysis/superimposition apparatus
64 TV apparatus
101 CPU
102 RAM
151 Image processing apparatus
152 Advertisement data DB
153 Team information DB
154 Other information DB
155 Advertisement selection unit
156 Overlay unit
161 Advertisement-region setting unit
162 Venue-meta recognition unit
163 Game-state recognition unit
201 OTT delivery system
211 Analysis apparatus
212 User terminal
213 Advertisement server
214 EC server
221 Internet

The invention claimed is:

1. An image processing apparatus comprising:
circuitry configured to
set, based on a density of people in a predetermined region within a captured image, an image display region for superimposition of an image on the captured image,
select, based on a result of analysis of the captured image, a candidate for the image to be superimposed on the image display region, and
superimpose, on the captured image, the candidate for the image on the image display region,
wherein the circuitry selects the candidate for the image from among a plurality of candidates determined by analysis of the captured image,
wherein the captured image corresponds to a specific event captured, and
wherein the circuitry selects the candidate for the image based on an advertisement image disposed in a venue of the specific event, the advertisement image being detected by analysis of the captured image.

2. The image processing apparatus according to claim 1, wherein in a case where a region specified based on the density of people within the predetermined region has an area not less than a certain area, the region setting unit sets the specified region as the image display region.

3. The image processing apparatus according to claim 2, wherein the captured image corresponds to a specific event captured, and
the predetermined region corresponds to an object region related to the specific event.

4. The image processing apparatus according to claim 3, wherein the object region corresponds to an audience seat region.

5. The image processing apparatus according to claim 4, wherein the specified region corresponds to a region with a number of vacant audience seats above a threshold.

6. The image processing apparatus according to claim 1, wherein the captured image corresponds to a game captured, and
the circuitry selects the candidate for the image based on information regarding a team playing the game, the information being acquired from analysis of the captured image.

7. The image processing apparatus according to claim 6, wherein the information regarding the team corresponds to information regarding respective regions of a home team and an away team within a venue.

8. The image processing apparatus according to claim 1, wherein the captured image corresponds to a specific event captured, and
the circuitry selects the candidate for the image based on information regarding a sponsor of the specific event.

9. The image processing apparatus according to claim 1, wherein, as the image to be superimposed on the image display region, the circuitry determines, from among the plurality of candidates for the image, the advertisement image of a sponsor of an advertisement among a plurality of advertisements disposed in the venue of the specific event, the advertisement having not been detected from the captured image.

10. The image processing apparatus according to claim 1, wherein the captured image corresponds to a specific event captured, and
the circuitry selects the candidate for the image based on a state of the specific event acquired from analysis of the captured image.

11. The image processing apparatus according to claim 1, wherein the circuitry selects the candidate for the image in accordance with a shape of the advertisement display region.

12. The image processing apparatus according to claim 1, wherein the circuitry superimposes the advertisement image determined from among a plurality of candidates for the advertisement image detected by analysis of the captured image.

13. An image processing method to be performed by an image processing apparatus, the image processing method comprising:
setting, based on a density of people in a predetermined region within a captured image, an image display region for superimposition of an image on the captured image;
selecting, based on a result of analysis of the captured image, a candidate for the image to be superimposed on the image display region; and
superimposing, on the captured image, the candidate for the image on the image display region,
wherein the candidate for the image is selected from among a plurality of candidates determined by analysis of the captured image,
wherein the captured image corresponds to a specific event captured, and
wherein the candidate for the image is selected based on an advertisement image disposed in a venue of the specific event, the advertisement image being detected by analysis of the captured image.

14. A non-transitory computer-readable storage medium having embodied thereon a program, which when executed by a computer causes the computer to execute a method, the method comprising:
setting, based on a density of people in a predetermined region within a captured image, an image display region for superimposition of an image on the captured image;
selecting, based on a result of analysis of the captured image, a candidate for the image to be superimposed on the image display region; and
superimposing, on the captured image, the candidate for the image on the image display region,
wherein the candidate for the image is selected from among a plurality of candidates determined by analysis of the captured image,
wherein the captured image corresponds to a specific event captured, and
wherein the candidate for the image is selected based on an advertisement image disposed in a venue of the specific event, the advertisement image being detected by analysis of the captured image.

* * * * *